(12) United States Patent
Reisch et al.

(10) Patent No.: US 9,945,461 B2
(45) Date of Patent: Apr. 17, 2018

(54) PARALLEL GEARSHIFT TRANSMISSION OF A MOTOR VEHICLE

(75) Inventors: Matthias Reisch, Ravensburg (DE); Stefan Beck, Eriskirch (DE); Martin Fellmann, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 626 days.

(21) Appl. No.: 14/118,711

(22) PCT Filed: Mar. 20, 2012

(86) PCT No.: PCT/EP2012/054878
§ 371 (c)(1),
(2), (4) Date: Nov. 19, 2013

(87) PCT Pub. No.: WO2012/159794
PCT Pub. Date: Nov. 29, 2012

(65) Prior Publication Data
US 2014/0109705 A1    Apr. 24, 2014

(30) Foreign Application Priority Data

May 24, 2011    (DE) .................. 10 2011 076 390

(51) Int. Cl.
*F16H 3/093* (2006.01)
*F16H 3/08* (2006.01)
(Continued)

(52) U.S. Cl.
CPC ........... *F16H 37/043* (2013.01); *F16H 3/006* (2013.01); *F16H 3/093* (2013.01);
(Continued)

(58) Field of Classification Search
CPC ............... F16H 2003/0822; F16H 3/97; F16H 2037/044; F16H 2312/09;
(Continued)

(56) References Cited

U.S. PATENT DOCUMENTS 4,461,188 A * 7/1984 Fisher ............... F16H 3/006
74/330
5,592,854 A   1/1997 Alfredsson
(Continued)

FOREIGN PATENT DOCUMENTS

DE          693 08 576 T2    9/1997
DE     10 2007 000 595 A1    5/2009
(Continued)

OTHER PUBLICATIONS

International Search Report Corresponding to PCT/EP2012/054878 dated May 4, 2012.
(Continued)

*Primary Examiner* — Ha Dinh Ho
*Assistant Examiner* — Bobby Rushing, Jr.
(74) *Attorney, Agent, or Firm* — Davis & Bujold PLLC; Michael J. Bujold (57) ABSTRACT

A parallel shift transmission of a motor vehicle comprising splitter and range groups. At least the splitter group is split into two parallel transmission branches having countershafts. One branch can be actuated by a power-shift element to transfer rotation of a drive shaft to a countershaft, via a stepped transmission ratio of the splitter group according to the actuation of one of the transmission branches and then converting and transmitting the rotation, via one of a plurality of range transmission ratios of the range group, to an output shaft. In order to reverse rotation, parallel countershafts can be coupled by individual gearwheel pairs by actuation of associated switching elements such that one countershaft, at the output side of the splitter group in the flow of power flow from the drive to the output shaft, is connected to the other countershaft at a drive side of the range group.

13 Claims, 7 Drawing Sheets

(51) Int. Cl.
*F16H 37/04* (2006.01)
*F16H 3/00* (2006.01)

(52) U.S. Cl.
CPC ................ *F16H 2003/0822* (2013.01); *F16H 2200/0065* (2013.01); *F16H 2200/0078* (2013.01); *Y10T 74/19233* (2015.01)

(58) Field of Classification Search
CPC ............. F16H 2200/0082; F16H 3/093; F16H 2003/0933; F16H 3/10; F16H 2037/045
USPC ... 74/664, 665 R, 665 G, 665 GA, 325, 329, 74/330, 331, 334
See application file for complete search history.

(56) References Cited

U.S. PATENT DOCUMENTS

| | | | | |
|---|---|---|---|---|
| 6,958,028 | B2* | 10/2005 | Janson | F16H 3/006 475/207 |
| 7,155,994 | B2* | 1/2007 | Gumpoltsberger | B60K 17/08 74/331 |
| 7,470,206 | B2* | 12/2008 | Rodgers, II | F16H 37/042 475/207 |
| 7,878,083 | B2* | 2/2011 | Nicklass | F16H 3/006 74/330 |
| 7,914,412 | B2* | 3/2011 | Gitt | F16H 37/042 475/207 |
| 8,142,322 | B2* | 3/2012 | Raszkowski | F16D 25/061 475/207 |
| 8,485,056 | B2* | 7/2013 | Ross | F16H 3/006 74/330 |
| 8,635,925 | B2* | 1/2014 | Gerlofs | F16H 61/16 74/329 |
| 2004/0144190 | A1 | 7/2004 | Hall, III | |
| 2011/0036186 | A1 | 2/2011 | Gumpoltsberger et al. | |
| 2012/0216639 | A1* | 8/2012 | Renner | F16H 63/20 74/331 |

FOREIGN PATENT DOCUMENTS

EP    0 797 025 A1    9/1997
WO    94/07055 A1    3/1994

OTHER PUBLICATIONS

Written Opinion Corresponding to PCT/EP2012/054878 dated May 4, 2012.

* cited by examiner

PARALLEL GEARSHIFT TRANSMISSION OF A MOTOR VEHICLE

This application is a National Stage completion of PCT/EP2012/054878 filed Mar. 20, 2012, which claims priority from German patent application serial no. 10 2011 076 390.2 filed May 24, 2011.

FIELD OF THE INVENTION

The invention relates to a parallel shift transmission of a motor vehicle, in particular of an agricultural or communal commercial vehicle, comprising a splitter group part and a range group part, of which at least the splitter group part is split into two parallel transmission branches having countershafts, wherein one of the transmission branches can be selected by actuating an associated power-shift element, thereby enabling rotational movement of a drive shaft to be transferred to a countershaft at one of a plurality of stepped transmission ratios of the splitter group part according to the selection of one of the transmission branches and, proceeding therefrom, enabling the rotational movement to be converted into rotational movement of an output shaft at one of a plurality of range transmission ratios of the range group part, wherein each of the stepped transmission ratios is defined by shifting an associated gear step of a plurality of gear steps of the splitter group part, which are distributed in an alternating manner to the two transmission branches in an associated stepped transmission ratio sequence, and each of the range transmission ratios is determined by shifting an associated group step of a plurality of group steps of the range group part.

BACKGROUND OF THE INVENTION

In the case of heavy machines, due to the broad scope of tasks performed by an agricultural or communal commercial vehicle, a transmission must implement highly diverse driving ranges, for example for field working activities or for travel on the road for purposes of transport or transfer, and so a correspondingly large spread between the slowest and the fastest gear step is necessary. Furthermore, heavy machines require small geometric step changes between the individual gears, which, in combination with the large spread, means that a large number of gear steps must be provided. This large number can be achieved with an acceptable degree of complexity by means of a group design of a transmission. Therefore, a heavy-machine transmission usually comprises an upstream or downstream splitter gearing part, followed by a stepped or main gearing part, a downstream group gearing part, and a reversing gearing part. A gear sequence of the transmission is predetermined via the main gearing part and is compressed by means of the upstream or downstream splitter gearing part in that each of the gear steps of the main gearing part is split by small step changes of the splitter gearing part and, therefore, the total number of gears is increased in that this total number is thus multiplied by the number of possible steps of the splitter gearing part. The gear sequence is expanded, however, by means of a downstream group gearing part in that the gear steps of the main gearing part are converted into different transmission ranges by means of large transmission ratio increments of the group gearing part. It is then possible to reverse the direction of rotation by means of the reversing gearing part, which is also usually provided, and, in combination with the other transmission parts, it is usually possible to also shift a plurality of reverse gears.

In modern heavy-machine transmissions, however, the splitter gearing part and the main gearing part are often combined to form a common splitter group part, downstream of which a group gearing part in the form of a range group part is installed. These transmissions are usually also power-shiftable, at least in part, thereby ensuring that a gear shift can be implemented without interruption of tractive force during operation of the heavy machine. In this context, heavy-machine transmissions are also often designed as so-called parallel shift transmissions, in which the power-shiftability is achieved by switching between two transmission branches according to an actuation of associated power-shift elements.

Document DE 10 2007 000 595 A1 describes a parallel shift transmission comprising a splitter group part and a range group part. Therein, the splitter group part performs the function of a main gearing part and a splitter gearing part, while the downstream range group part functions as a group gearing part. The splitter group part and the range group part are then split into two parallel transmission branches, wherein the particular transmission branch is selected by actuating an associated power-shift element. The two power-shift elements of the transmission branches are combined in a double clutch, which transfers rotational movement of a drive shaft of the parallel shift transmission to one of two input shafts of the splitter group part. Proceeding from the input shaft that has been selected, this rotational movement is transferred to a parallel-extending countershaft of the two transmission branches at a stepped transmission ratio according to the selection of one a plurality of gear steps of the splitter group part. Proceeding therefrom, the rotational movement of the respective countershaft is transferred to an output shaft of the parallel shift transmission at a selected range transmission ratio, which is defined by shifting to an associated group step of the range group part. The gear steps of the splitter group part are distributed to the two transmission branches in an alternating manner in the sequence of their associated stepped transmission ratios, and thus a switch back and forth between the two transmission branches occurs as the individual stepped transmission ratios are shifted in succession. Therefore, it is possible to preselect the associated gear step in the currently unloaded transmission branch before shifting to the next stepped transmission ratio, thereby ensuring that it is only necessary to disengage the power-shift element of one branch and engage that of the other branch in order to implement the shift. As a result, the stepped transmission ratio can be changed under load and, therefore, without interruption of tractive force. The group steps of the downstream range group part, however, can each be implemented by means of both transmission branches, wherein a transition from the last gear step in a group step to the first gear step of the subsequent group step can be carried out under load in this case as well. Overall, a fully power-shiftable parallel shift transmission is thereby formed, in which no more than two gearwheel engagements ever occur under load at any speed, and which is therefore characterized by a high level of efficiency.

SUMMARY OF THE INVENTION

Proceeding from the prior art described above, the problem addressed by the present invention is that of providing a device for effecting a rotational direction reversal for a parallel shift transmission of the type in question, by means of which reverse gears can be implemented with the lowest possible reduction in efficiency compared to the forward gears. In addition, the same number of gears should be provided for rearward travel as for forward travel.

According to the invention, a parallel shift transmission of a motor vehicle comprises a splitter group part and a range group part, wherein, in particular, the parallel shift transmission is a transmission of an agricultural or communal commercial vehicle, i.e. a tractor, for example. Of the two group parts, the splitter group part, at the least, is then split into two parallel transmission branches having countershafts, wherein one branch can be selected by actuating an associated power-shift element. According to the selection that is made, rotational movement of a drive shaft is transferred at one of a plurality of stepped transmission ratios of the splitter group part to one of the countershafts and, proceeding therefrom, the rotational movement is converted into rotational movement of an output shaft of the transmission at one of a plurality of range transmission ratios. Each of the stepped transmission ratios is defined by an associated gear step of a plurality of gear steps of the splitter group part, wherein these gear steps are distributed to the two transmission branches in an alternating manner in a sequence of the stepped transmission ratios. In order to implement the stepped transmission ratios in succession, a switch therefore occurs back and forth between the two transmission branches when the associated gear steps are shifted. The individual range transmission ratios of the range group part are implemented by shifting to an associated group step of a plurality of group steps.

The gear steps and group steps of the splitter group part and of the range group part are each preferably implemented as spur gear stages, each of which comprises a pinion, which is fixedly disposed on one of the shafts, and an idler gear, which meshes with this pinion and is rotatably mounted on the respective other shaft. The respective idler gear can then be coupled in a rotationally fixed manner to the respective shaft by means of an associated shift element, wherein the respective shift element is embodied as a form-locking clutch in particular, and preferably in the form of a locking synchronization or claw clutch. In addition, shifting elements of two axially adjacent spur gear stages, in particular, are combined in one common shifting group, the clutch element of which, from a neutral position, couples either one or the other idler gear to the respective shaft on which the shifting group is mounted.

Within the scope of the invention, it is possible for either only the splitter group part or the splitter group part and the range group part to be split into the two branches. In the event that the range group part is split into the two branches, each of the individual group steps can then be implemented by means of both transmission branches in that a conversion at the respective range transmission ratio can be implemented by means of the spur gear stages of the range group part from both branches.

Depending on the placement of the power-shift elements of the transmission branches, countershafts are fixedly assigned to each of the transmission branches or the transmission branches access one of the shared, parallel countershafts upon selection by actuation of the associated power-shift element. In addition, the drive shaft and the output shaft can be disposed either coaxially or parallel and offset relative to one another.

The invention comprises the technical teaching that parallel countershafts of the two transmission branches can be coupled to one another by means of individual gearwheel pairs according to an actuation of associated switching elements such that one countershaft at the output side of the splitter group part in the power flow direction from the drive shaft to the output shaft is connected to the other countershaft at a drive side of the range group part. In other words, after conversion in the splitter group part, the respective rotational movement of one countershaft is transferred by means of one of the two gearwheel pairs to a countershaft that extends parallel to the aforementioned countershaft and is disposed upstream of the range group part.

By means of such a design, a rotational direction reversal can be integrated into the parallel shift transmission without the need to provide a separate reversing gearing part. Therefore, only one additional gear engagement is required in order to implement a particular reverse gear, thereby ensuring that the overall efficiency is only slightly reduced in rearward travel as compared to forward travel. Furthermore, according to a further embodiment of the parallel shift transmission, it is possible to implement power shiftability of the reverse gears and, therefore, a reversing operation of the particular motor vehicle without the need to provide additional power-shift elements. The efficiency can therefore be further increased as compared to systems in which separate power-shift elements must be provided in a reversing set, since these additional power-shifting elements can be omitted, which otherwise run at a notable rotational speed differential during the entire operating time and result in corresponding losses. Furthermore, a rotational direction reversal can even be implemented by means of a small number of additional transmission elements, which correspondingly reduces the manufacturing expenditure as compared to systems comprising a separate reversing set. The parallel shift transmission according to the invention also makes it possible to implement the same number of gears for rearward travel as for forward travel.

The switching elements are shift elements having a design similar to that of the other shift elements of the gear and group steps, in particular being designed as form-locking shift elements, for example in the form of locking synchronizations or claw clutches. In addition, a switching element of the respective gearwheel pair can be formed either as a shifting group or by means of two individual shift elements, depending on the placement in the parallel shift transmission. Furthermore, the gearwheel pairs provided for effecting a rotational direction reversal can be disposed either in the splitter group part or in the range group part.

According to an advantageous embodiment of the invention, the associated switching element is positioned between the respective gearwheel pair and the power-shift elements in the power flow direction from the drive shaft to the output shaft. By means of such a placement in the power flow direction, a switch from forward travel to rearward travel can even be implemented under load, i.e. reversing operation of the motor vehicle is possible. This is the case since, due to the intermediate placement of the associated switching element, coupling of the parallel countershafts can already be preselected during forward travel and then a switch to rearward travel operation can be implemented simply by switching the power-shift elements.

According to an alternative embodiment, the respective gearwheel pair is positioned between the power-shift elements and the associated switching element in the power flow direction from the drive shaft to the output shaft. It is thereby possible to simplify the design of the transmission in the region of the countershafts, which reduces the manufacturing expenditure accordingly. This is the case since one countershaft designed as a hollow shaft can be omitted from the transmission branches, depending on the embodiment of the transmission. In such an arrangement, however, power shiftability into rearward travel operation and, therefore, the reversibility of the commercial vehicle is lost.

In a further development of the invention, the power-shift elements of the transmission branches are combined in a double clutch, wherein either a first input shaft, to which the gear steps of one transmission branch are coupled, or a second input shaft, to which the gear steps of the other transmission branch are connected, can be coupled to the drive shaft by means of the double clutch. A compact combination of the two power-shift elements and a central split into the two transmission branches can therefore be achieved.

Alternatively, the power-shift elements of the transmission branches are designed as individual clutches, each of which is positioned between countershafts of the corresponding transmission branch. In this case, the respective individual clutch in the power flow direction from the drive shaft to the output shaft is positioned either between the splitter group part and the respective gearwheel pair for effecting the rotational direction reversal or between the respective gearwheel pair and the range group part. Due to the embodiment of the power-shift elements as individual clutches, the countershafts can be explicitly assigned to the respective transmission branches and, therefore, the gear steps of the splitter group part can also be explicitly assigned. In addition, an auxiliary drive of a drive motor of the heavy machine, which is provided to drive a power take-off shaft, for example, can be easily guided through the transmission since, in this case, it is not necessary to implement passage through a double clutch located in the region of the drive shaft.

According to a further, advantageous embodiment of the invention, at least gear steps of the splitter group part having a high stepped transmission ratio are positioned in the axial direction such that each lies individually on an associated plane, and/or at least group steps of the range group part having a high range transmission ratio are disposed individually for each transmission branch in the axial direction such that each lies on an associated plane. This at least partial axial placement of the individual gearwheel pairs one behind the other has the advantage—in particular at the respective steps having high gear ratios and due to the large gearwheels associated therewith—that the parallel countershafts can be positioned more closely together and, therefore, the gearwheel pairs for implementing the rotational direction reversal can also be reduced in size. In an individual case, however, all the gear steps of the splitter group part and/or all group steps of the range group part can be arranged axially one behind the other. This arrangement, one behind the other, can be achieved either by providing a separate fixed gear per step or by means of a broader design of the individual fixed gear, wherein the broader fixed gear then meshes with two idler gears, which are axially offset relative to one another.

Alternatively, gear steps of the splitter group part are provided in pairs in the axial direction such that each lies in a plane and/or at least individual group steps of the range group part for both transmission branches are each provided in one axial plane. Advantageously, the overall axial length of the transmission can be reduced as a result.

According to a further embodiment of the invention, a higher gear step is preselected before actuation of one of the switching elements in order to couple the parallel countershafts in the respective unloaded transmission branch. Alternatively, a gear step is not shifted in the respectively unloaded transmission branch before actuation of one of the switching elements in order to couple the parallel countershafts. By means of both measures, the synchronizing energies in the respective switching element and, therefore, the load thereof, can be reduced.

The invention is not limited to the stated combination of features of the main claim or of the dependent claims. It is also possible to combine individual features with one another, provided they arise from the claims, the following description of embodiments, or directly from the drawings. The reference in the claims to the drawings by the use of reference characters is not intended to limit the scope of protection of the claims.

BRIEF DESCRIPTION OF THE DRAWINGS

Further, advantageous embodiments of the invention arise from the following description of preferred embodiments of the invention, which refer to the figures depicted in the drawings. They show.

DETAILED DESCRIPTION OF THE PREFERRED EMBODIMENTS

Figure 1:
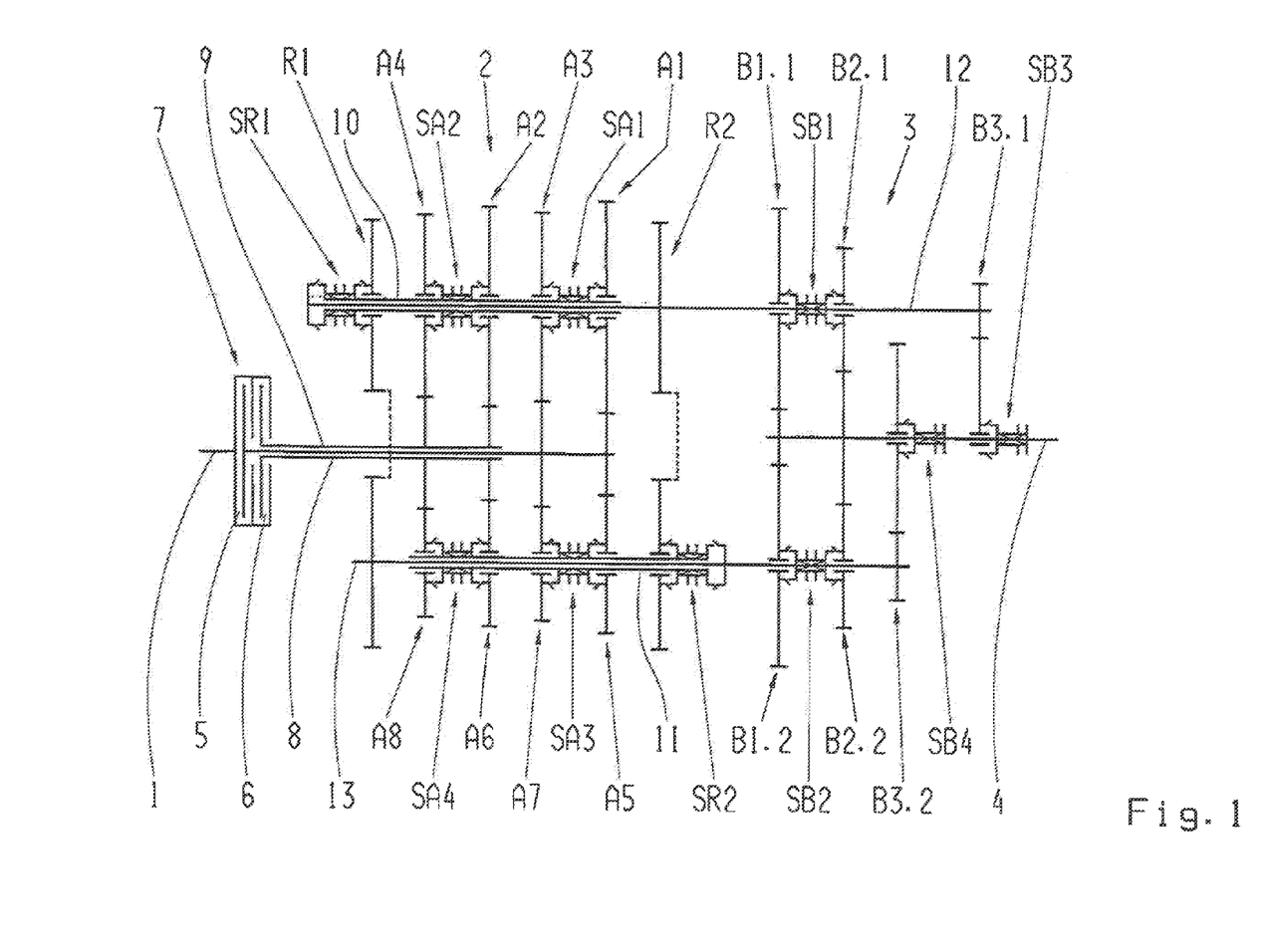
FIG. 1 a schematic representation of a parallel shift transmission according to the invention, according to a first preferred embodiment of the invention.

FIG. 1 shows a schematic representation of a parallel shift transmission according to the invention, which is preferably a transmission of a communal or agricultural commercial vehicle. This parallel shift transmission comprises a drive shaft 1, which is coupled to a drive motor of the motor vehicle and the rotational movement of which, converted by means of an intermediate splitter group part 2 and an intermediate range group part 3, can be transferred to an output shaft 4. The output shaft 4 is connected downstream thereof to further components of a drive train of the motor vehicle. Power-shift elements 5 and 6, which are combined in the form of a double clutch 7, are provided between the drive shaft 1 and the splitter group part 2. According to an actuation of the power-shift elements 5 and 6 in an alternating manner, the drive shaft 1 is coupled either to a first input shaft 8 or to a second input shaft 9, wherein the second input shaft 9 extends coaxially to the first input shaft 8 and is designed as a hollow shaft. As is evident in combination with the transmission scheme in FIG. 2 in particular, the two power-shift elements 5 and 6 therefore split the splitter group part 2 into two transmission branches.

Two fixed gears are positioned on each of the input shafts 8 and 9, wherein each of these fixed gears meshes individually with idler gears rotatably mounted on each of the countershafts 10 and 11, which are disposed parallel to one another. Each of the fixed gears positioned on the input shafts 8 and 9 forms, in combination with each idler gear running on the respective countershaft 10 or 11, one of the gear steps A1 to A8. The idler gears for implementing the gear steps A1 to A4 are disposed on the countershaft 10 and the idler gears for implementing the gear steps A5 to A8 are disposed on the countershaft 11. Furthermore, all uneven gear steps A1, A3, A5 and A7 are connected to the first input shaft 8 according to the arrangement of the fixed gears of the uneven gear steps and are therefore disposed in one transmission branch, and all even gear steps A2, A4, A6 and A8 are coupled to the second input shaft 9 and are therefore positioned in the respective other transmission branch. A respective stepped transmission ratio of the gear steps A1 to A8 decreases along the succession A1 to A8, each with geometric step changes, and therefore the gear steps A1 to A8 are distributed in an alternating manner to the two transmission branches in a sequence of the associated stepped transmission ratios.

FIG. 1 also shows that the countershaft 10 is designed as a hollow shaft, which extends coaxially with respect to a countershaft 12. The countershaft 11 is also designed as a hollow shaft, which is disposed coaxially with respect to a further countershaft 13. The individual idler gears of the gear steps A1 to A8 can now each be coupled in a rotationally fixed manner to the respective countershaft 10 or 11 by means of shift elements, wherein the shift elements are combined in shifting groups SA1 to SA4, of which each of the shifting groups SA1 to SA4 can assume a neutral position or connect one of the idler gears associated therewith to the respective countershaft 10 or 11 in a rotationally fixed manner.

Figure 3:
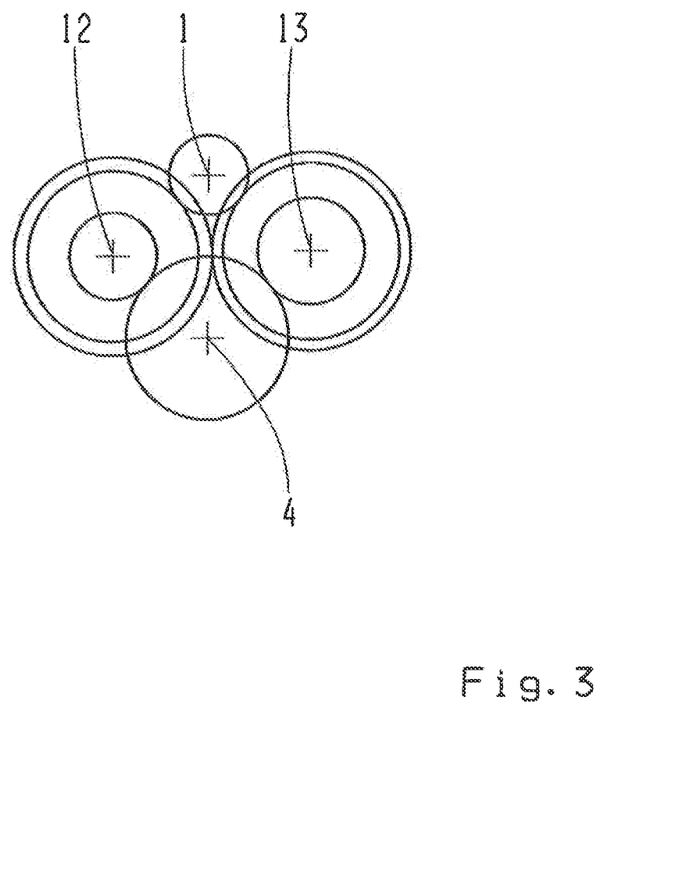
FIG. 3 a schematic, face-side view of the parallel shift transmission according to FIG. 1.

An arrangement of the drive shaft 1, the output shaft 4, and the countershafts 12 and 13 with respect to one another is shown in the schematic, face-side view of the parallel shift transmission in FIG. 3. As shown, the drive shaft 1 and the output shaft 4 are positioned such that these extend parallel to one another, wherein the countershafts 12 and 13 extend on either side of a plane extending through the drive shaft 1 and the output shaft 4. Within the scope of the invention, a coaxial positioning of the drive shaft 1 and the output shaft 4 is also feasible, however.

A respective rotational movement of the respective countershaft 12 or 13 is then transferred to the output shaft 4 in a converted manner by selecting one of a plurality of range transmission ratios of the range group part 3. For this, the range group part 3 comprises a plurality of group steps B1.1, B1.2, B2.1, B2.2, B3.1 and B3.2, wherein the group steps B1.1 and B1.2, B2.1 and B2.2, and B3.1 and B3.2 each implement the same range transmission ratio and therefore transfer rotational movement of the respective countershaft 12 or 13 to the output shaft 4 at the same transmission ratio. Fixed gears of the group steps B1.1, B1.2, B2.1 and B2.2 are disposed on the output shaft 4, wherein each of the fixed gears meshes with idler gears rotatably mounted on the countershafts 12 and 13. Moreover, two idler gears of the group steps B3.1 and B3.2 are rotatably positioned on the output shaft 4 and each is engaged individually with a fixed gear disposed on the countershaft 10 or 11. The respective idler gears can now be connected in a rotationally fixed manner by means of associated shift elements to the respective countershaft 12 or 13 and to the output shaft 4, and so the associated group step B1.1, B1.2, B2.1, B2.2, B3.1 or B3.2 is shifted and, therefore, the associated range transmission ratio is implemented.

FIG. 1 further shows that the shift elements of the group steps B1.1 and B2.1 and of the group steps B1.2 and B2.2 are combined in shifting groups SB1 and SB2, respectively. These shifting groups SB1 and SB2 can each assume a neutral position or connect one of the associated idler gears to the countershaft 12 or 13, respectively, in a rotationally fixed manner. Shift elements of the group steps B3.1 and B3.2 are designed as individual shift elements SB3 and SB4, however, which are either in the neutral position or couple the associated idler gear to the output shaft 4.

In all, it is therefore possible for the parallel shift transmission according to FIG. 1 to implement eight stepped transmission ratios by means of the gear steps A1 to A8 and three range transmission ratios by means of the group steps B1.1 to B3.2, thereby making it possible to shift a total of twenty-four forward gears. These gears can be power-shifted in succession in that, with the drive shaft 1 coupled by means of one of the power-shift elements 5 or 6 to the respective input shaft 8 or 9 and, therefore, to one of the two transmission branches, the gear step following the current gear step and the respective group step are preselected in the respective other transmission branch, thereby ensuring that shifting to the next gear can be implemented merely by switching between the power-shift elements 5 and 6. If the last stepped transmission ratio of the splitter group part 2 has been reached, the first stepped transmission ratio can then be preselected together with a group step following the currently selected group step, thereby ensuring that a power shift can be implemented in this case as well.

FIG. 1 also shows that, of the gear steps A1 to A8 and of the group steps B1.1 to B3.2, the gear steps A1 and A5, A3 and A7, A2 and A6, as well as A4 and A8, and the group steps B1.1 and B1.2, as well as B2.1 and B2.2, are arranged in the axial direction on a common plane in each case, thereby making it possible to reduce the axial dimensions of the parallel shift transmission according to the invention. It is also feasible, however, to position at least some of the gear steps A1 to A8 in the axial direction on respectively separate planes and/or to provide the group steps B1.1 to B2.2, similar to the group steps B3.1 and B3.2, on a separate plane in the axial direction for each transmission branch. This side-by-side arrangement is advantageous for gear steps or group steps having a large transmission ratio in particular, such as A1 or B1.1 and B1.2, since this permits the countershafts 12 and 13 and, therefore, 10 and 11 in FIG. 3, to be placed more closely together while ensuring that idler gears on the countershafts 10 to 13 do not come into unwanted contact with one another.

In order to now also implement rearward travel of the commercial vehicle and, therefore, to ensure that the required rotational direction reversal can be effected in the parallel shift transmission, the parallel shift transmission according to the invention comprises two gearwheel pairs R1 and R2, by means of which the parallel countershafts 10 and 13 or 11 and 12, respectively, can be coupled to one another. To this end, the gearwheel pair R1 comprises a fixed gear, which is disposed on the countershaft 13 and meshes with an idler gear rotatably mounted on the countershaft 10. As a mirror image thereof, in the case of gearwheel pair R2, the fixed gear is mounted on the countershaft 12 and the idler gear meshing therewith is rotatably mounted on the countershaft 11, which extends in the form of a hollow shaft coaxially with respect to the countershaft 13. A switching element SR1 and SR2 is associated with the gearwheel pair R1 and R2, respectively, wherein said switching element is designed as a shifting group and, depending on the shift position, connects the respective idler gear of the gearwheel pair R1 or R2 to the countershaft 10 or 11, respectively, or connects the countershaft 10 or 11 to the coaxial countershaft 12 or 13, respectively, or, in a neutral position, does not implement coupling at all. The switching elements SR1 and SR2 therefore each perform the task, in forward travel operation, of coupling the countershaft 10 or 11, which is designed as a hollow shaft, to the countershaft 12 or 13, respectively, thereby making it possible to transfer a rotational movement of the drive shaft 1 at one of the stepped transmission ratios of the splitter group part 2 to the respective countershaft 12 or 13. In the other case, one countershaft 10 or 11 is coupled to the countershaft 13 or 12, respectively, which is extending parallel thereto, thereby effecting the rotational direction reversal.

Figure 2:
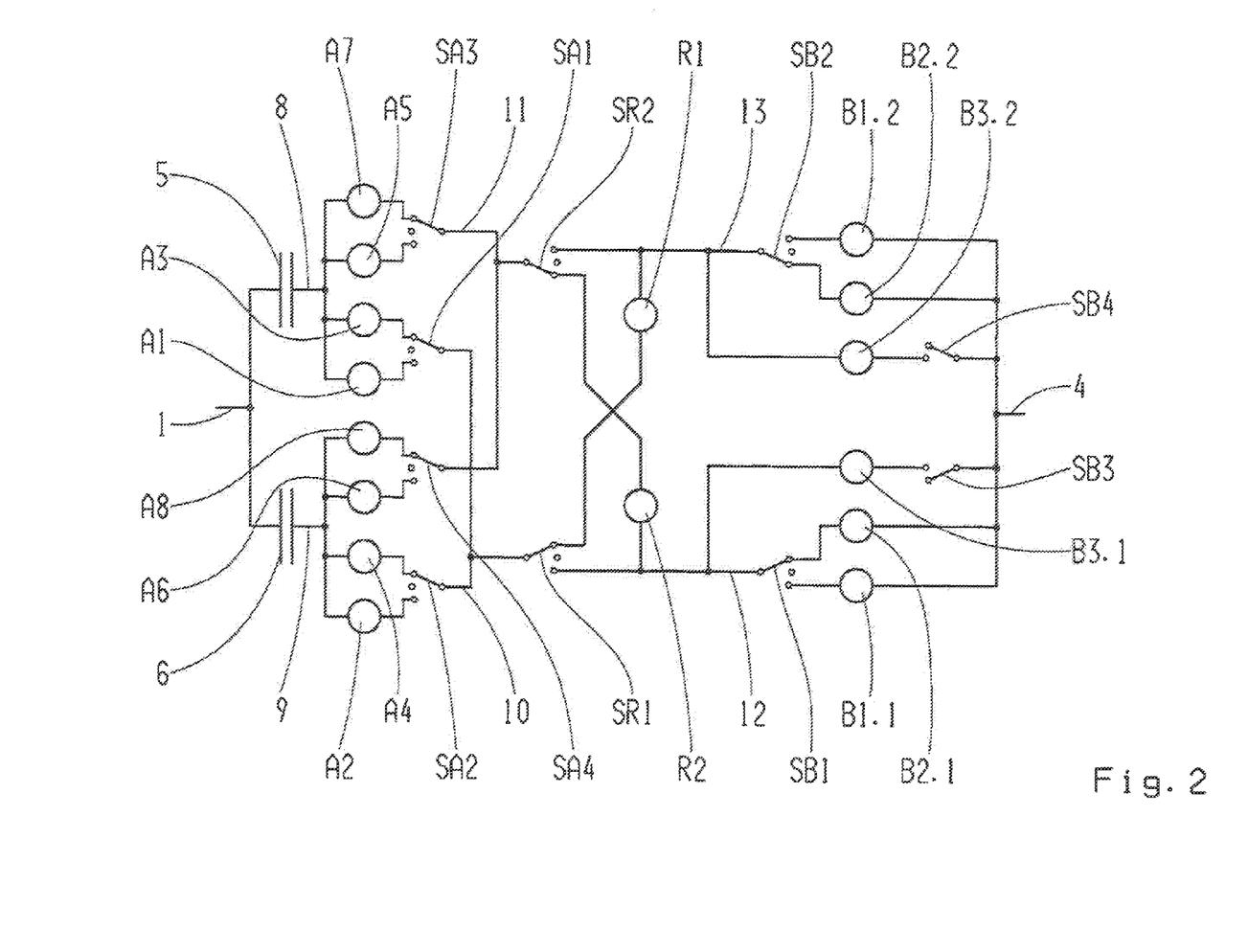
FIG. 2 a transmission scheme of the parallel shift transmission from FIG. 1.

As shown in combination with the transmission scheme in FIG. 2, in the case of the rotational direction reversal in the power flow direction from the drive shaft 1 to the output shaft 4, the gearwheel pairs R1 and R2 connect the splitter group part 2 on the output side to the drive-side region of the range group part 3. It is also shown that the associated switching element SR1 or SR2 is positioned between the gearwheel pair R1 or R2, respectively, and the power-shift elements 5 and 6 in the power flow direction. This arrangement makes it possible to also effect a rotational direction reversal under load and to therefore implement a reversing operation of the commercial vehicle. In this case, it is therefore possible to prepare a rotational direction reversal already during forward travel and while power is flowing via one of the transmission branches into the respective other transmission branch, wherein, in this case, the power flow is directed over one of the gearwheel pairs R1 or R2. It is possible to switch from forward travel to rearward travel without interruption of tractive force by switching between the power-shift elements 5 and 6. In order to reduce the synchronous energy to be applied by means of the respective switching element SR1 or SR2, a higher gear step of the gear steps A1 to A8, for example A8, can be preselected in the splitter group part 2 in the respectively unloaded transmission branch, or it is possible to not shift a gear step at all.

Figure 4:
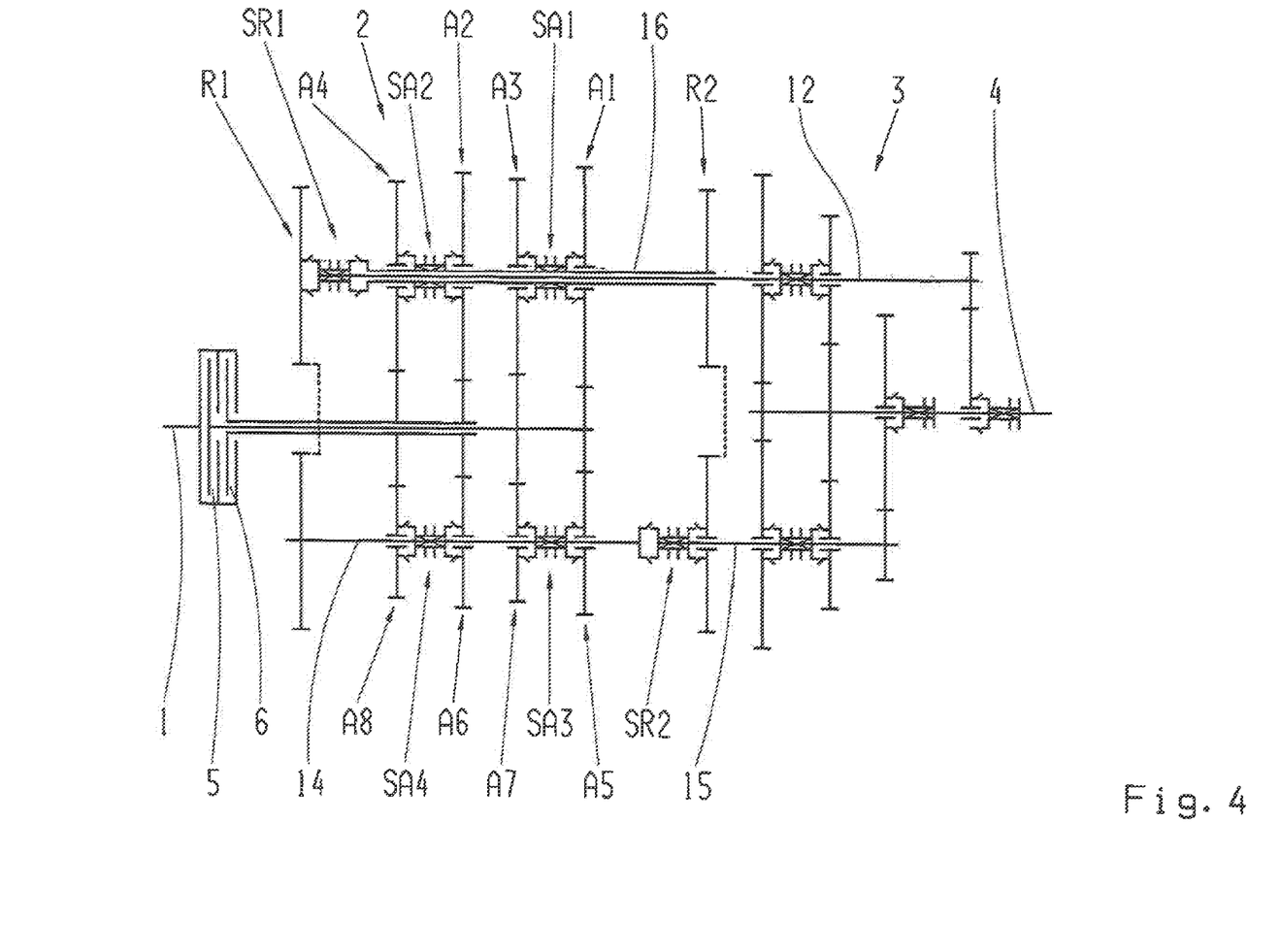
FIG. 4 a schematic representation of a parallel shift transmission according to the invention, according to a second preferred embodiment of the invention.
Figure 5:
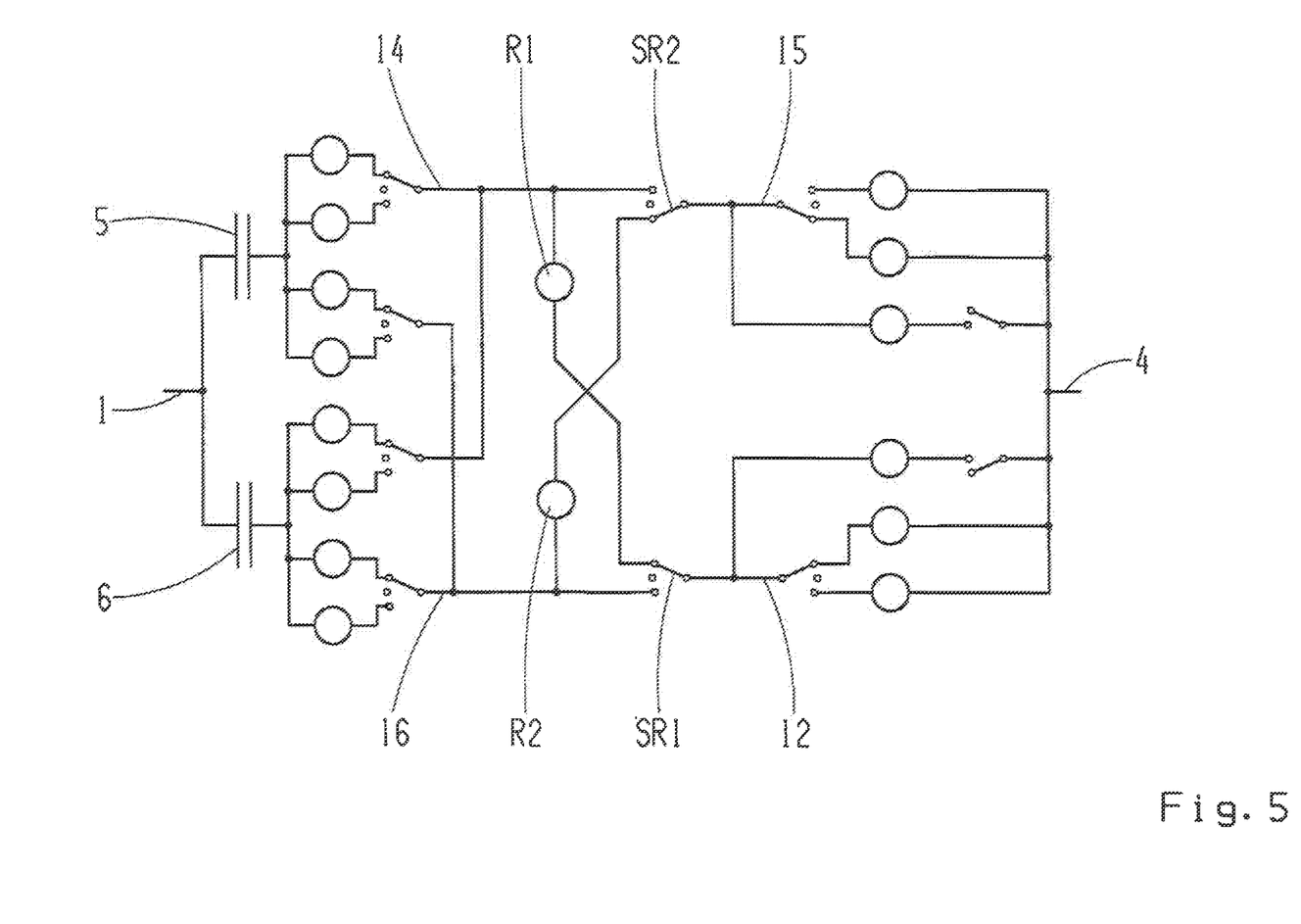
FIG. 5 a transmission scheme of the parallel shift transmission according to FIG. 4.

FIG. 4 shows a second preferred embodiment of a parallel shift transmission according to the invention. In contrast to the first embodiment of the invention, ring gears of the gear stages A5 to A8 in this case are not rotatably mounted on a countershaft designed as a hollow shaft, but rather are rotatably positioned directly on a countershaft 14. The idler gears of the gear steps A5 to A8 can therefore each be coupled directly to the countershaft 14 in a form-locked manner by means of the shifting groups SA3 and SA4. One countershaft is omitted by placing the respective gearwheel pair R1 or R2 between the power-shift elements 5 and 6 and the associated switching element SR1 or SR2, respectively, as illustrated in particular in the transmission scheme in FIG. 5. In this case, however, tractive force must be interrupted in order to reverse the rotational direction and, therefore, to switch between forward travel and rearward travel, i.e. the commercial vehicle is no longer reversible. This is the case because, in addition to switching the power-shift elements 5 and 6, it is also necessary to switch the respective switching element SR1 or SR2 located in the power flow. A further difference is that an additional countershaft 15, on which the idler gears of the group steps B1.2 and B2.2 are rotatably mounted and on which the fixed gear of the group step B3.2 is disposed, is provided coaxially with respect to the countershaft 14. The countershaft 15 can be coupled to the countershaft 14 by means of a corresponding switching position of the switching element SR2. Furthermore, an additional fixed gear of the gearwheel pair R2 is disposed on a countershaft 16, which rotatably guides the idler gears of the gear steps A1 to A4, wherein the countershaft 16 is designed as a hollow shaft and extends coaxially with respect to the countershaft 12.

Figure 6:
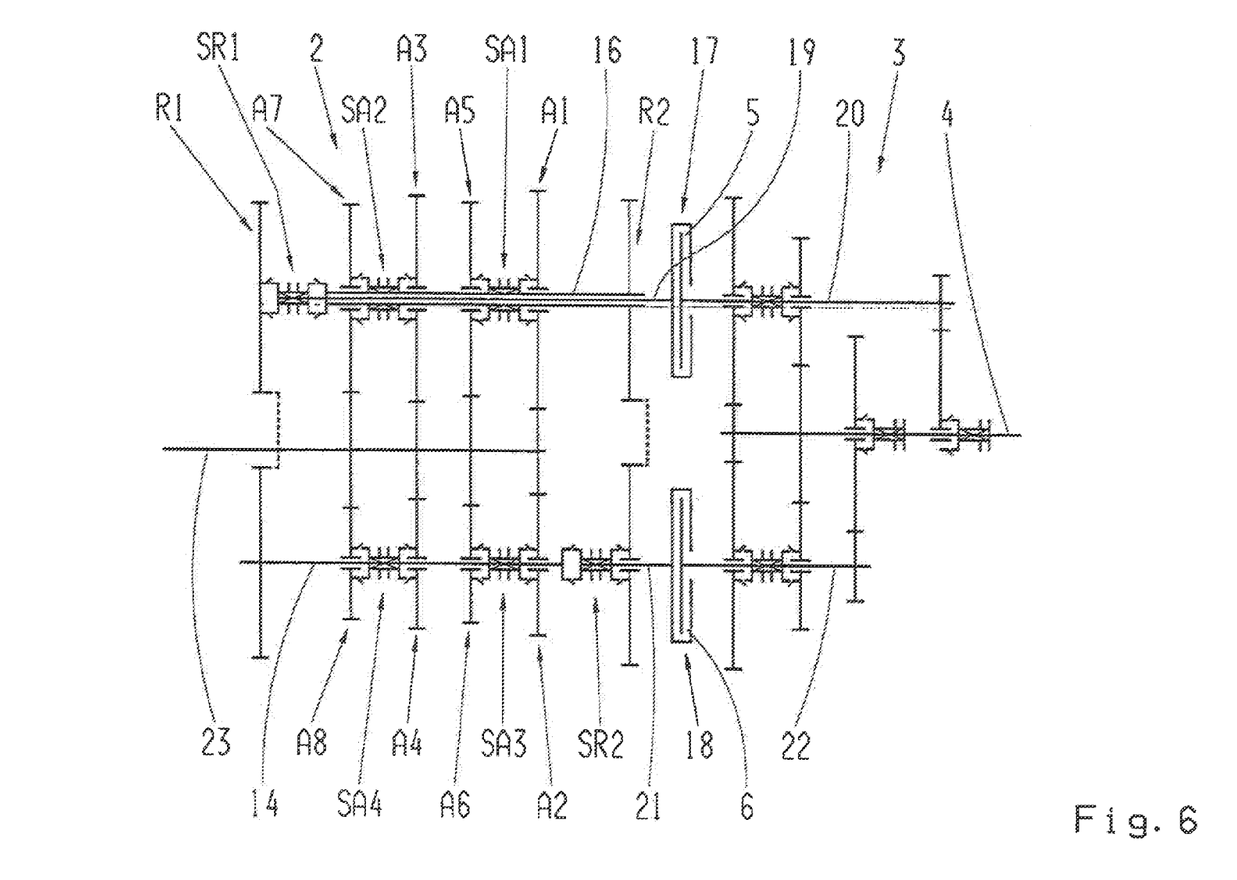
FIG. 6 a schematic representation of a parallel shift transmission according to the invention, according to a third preferred embodiment of the invention.

Finally, FIG. 6 shows a third preferred embodiment of a parallel shift transmission according to the invention. The difference from the second preferred embodiment is that the power-shift elements 5 and 6 in this case are individual clutches 17 and 18, provided between the respective output side of the splitter group part 2 and a respective drive side of the range group part 3. By means of the individual clutch 17 it is possible to couple a countershaft 19 of the splitter group part 2, with respect to which the countershaft 16 is coaxially disposed, and a countershaft 20 of the range group part 3. Correspondingly, a countershaft 21 and a countershaft 22 are connected to each other by means of the individual clutch 18 upon actuation, wherein the countershaft 21 can be coupled to the countershaft 14 by positioning the switching element SR2 accordingly. A further difference is that a drive shaft 23 in this case carries the fixed gears of the gear steps A1 to A8 of the splitter group part 2, the idler gears of which are also distributed to the countershaft 14 and the countershaft 16 such that the idler gears are sorted into even and uneven gear steps. Therefore, the transmission branches have been clearly split in this case, in that the countershafts 16, 19 and 20 have been assigned to one transmission branch and the countershafts 14, 21 and 22 has been assigned to the other transmission branch. As a further difference, the shifting groups SA1 to SA4 have also been assigned other idler gears of the gear steps A1 to A8 to be shifted, according to the rearrangement of the gear steps A1 to A8.

Figure 7:
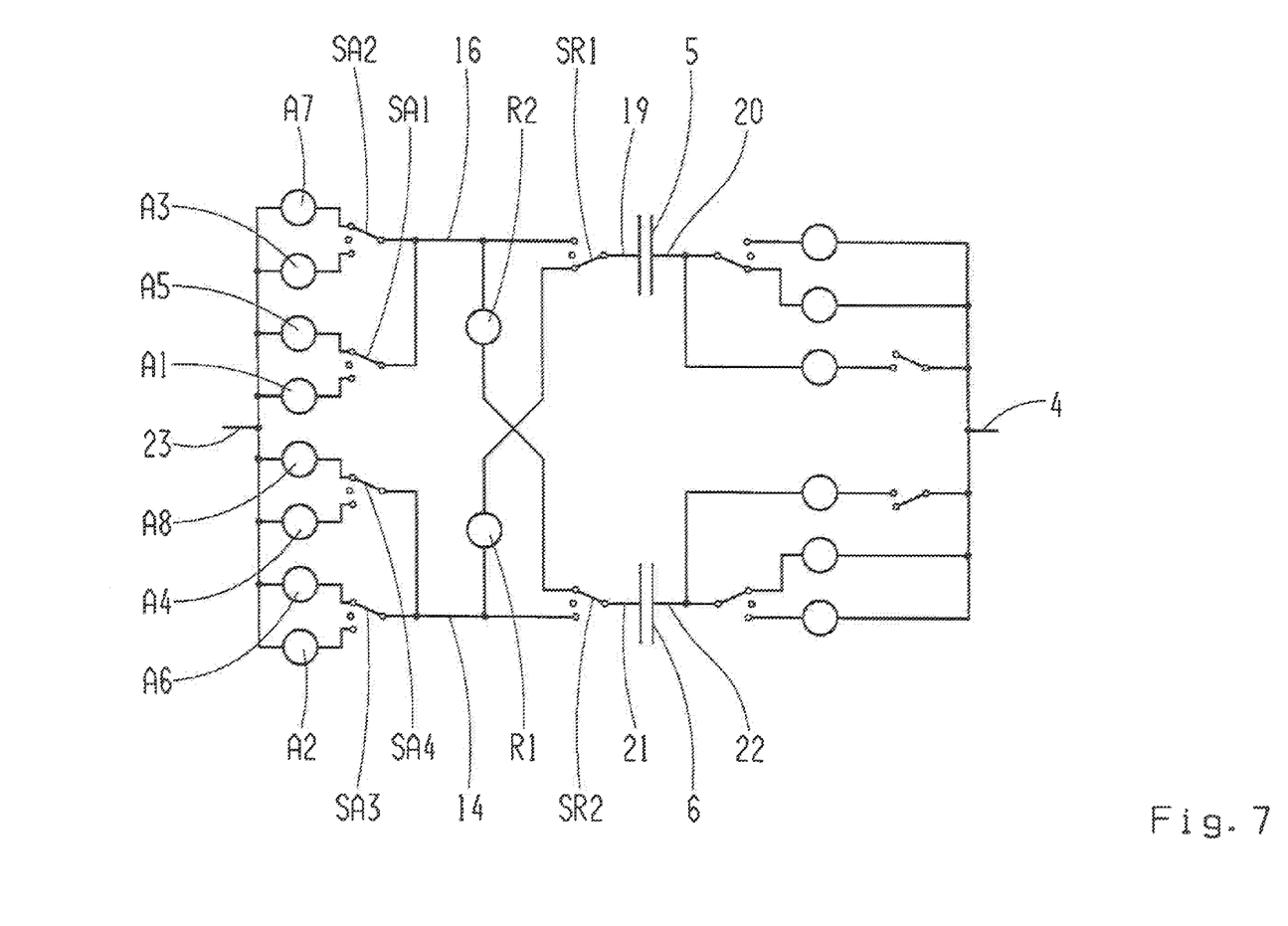
FIG. 7 a transmission scheme of the parallel shift transmission according to FIG. 6.

As shown in combination with the transmission scheme according to FIG. 7, in the case of the parallel shift transmission according to FIG. 6, the respective switching element SR1 or SR2 is positioned between the gearwheel pair R1 or R2, respectively, and the power-shift elements 5 and 6. In this case as well, a reversing operation of the commercial vehicle can be implemented by making a preselection in the currently unloaded transmission branch. Particularly advantageously, however, reversal can take place in the identical gear steps A1 to A8 by preselecting the same gear step and the respective gearwheel pair R1 or R2 in the respectively unloaded transmission branch and then merely implementing a switch by means of the power-shift elements 5 and 6.

In the above-described embodiments of the invention, twenty-four forward gears and twenty-four reverse gears can be implemented. It will be clear to a person skilled in the art, however, that other numbers of gears can also be implemented by designing the splitter group part 2 and the range group part 3 accordingly. It is also possible to change the arrangements of the individual gearwheel planes of the splitter group part 2 and/or of the range group part 3 in the axial direction, i.e. of the gear steps A1 to A8 and of the group steps B1.1 to B3.2. Within the scope of the invention it is also feasible to design the shift elements and the switching elements as any type of clutch, however preferably as form-locking clutches in the form of locking synchronizations or claw clutches. It is also feasible to design a portion of the shift elements as locking synchronizations and another portion as centrally synchronized claws.

By means of an embodiment of a parallel shift transmission according to the invention, it is therefore possible to effect a rotational direction reversal in the parallel shift transmission with just one additional gear engagement and, therefore, to only slightly reduce the efficiency of the transmission compared to that of forward travel. In addition, in individual embodiments of the invention, a directional rotation reversal can be effected without interruption of tractive force, thereby permitting a reversing operation of the commercial vehicle.

REFERENCE CHARACTERS 1 drive shaft
2 splitter group part
3 range group part
4 output shaft
5 power-shift element
6 power-shift element
7 double clutch
8 first input shaft
9 second input shaft
10 countershaft
11 countershaft
12 countershaft
13 countershaft
14 countershaft
15 countershaft
16 countershaft
17 individual clutch
18 individual clutch
19 countershaft
20 countershaft
21 countershaft
22 countershaft
23 drive shaft
A1-A8 gear steps
SA1 shifting group
SA2 shifting group
SA3 shifting group
SA4 shifting group
B1.1 group step
B1.2 group step
B2.1 group step
B2.2 group step
B3.1 group step
B3.2 group step
SB1 shifting group
SB2 shifting group
SB3 individual shift element
SB4 individual shift element
R1 gearwheel pair
R2 gearwheel pair
SR1 switching element
SR2 switching element

The invention claimed is:

1. A parallel shift transmission of a motor vehicle comprising:
  first and second power-shift elements (5, 6),
  a splitter group part (2) and a range group part (3),
  the splitter group part (2) is split into two parallel transmission branches having countershafts (10, 11, 14, 16) and the range group part (3) is split into two parallel transmission branches having countershafts (12, 13, 15, 20, 22), the countershafts of the splitter group part are separate from the countershafts of the range group part, at least one of the countershafts of the splitter group part is hollow, and one of the countershafts of the range group part extends completely through the at least one hollow countershaft of the splitter group part,
  each one of the transmission branches of the splitter group part is selected by actuating an associated one of the first and the second power-shift elements (5, 6) thereby enabling a rotational movement of a drive shaft (1; 23) to be transferred to the respective countershafts (10, 11; 14, 16) of the splitter group part at one of a plurality of stepped transmission ratios of the splitter group part (2) according to selection of one of the transmission branches of the splitter group part and, proceeding therefrom, enabling the rotational movement to be converted into a rotational movement of an output shaft (4) at one of a plurality of range transmission ratios of the range group part (3),
  each of the stepped transmission ratios is defined by shifting an associated gear step of a plurality of gear steps (A1 to A8) of the splitter group part (2), the associated gear steps of the plurality of gear steps of the splitter group part are distributed, in an alternating manner, to the two transmission branches of the splitter group part (2) in a sequence of the associated stepped transmission ratios,
  each of the range transmission ratios is determined by shifting an associated group step of a plurality of group steps (B1.1 to B3.2) of the range group part (3), and
  the parallel countershafts (10 to 13; 12, 14, 15, 16; 14, 16, 19 to 22) of the splitter group part and the range group part are couplable to one another by individual gearwheel pairs (R1, R2) according to an actuation of an associated switching element (SR1, SR2) in order to effect a rotational direction reversal such that, with respect to a direction of power flow from the drive shaft (1; 23) to the output shaft (4), an output side of one of the countershafts of the splitter group part (2) is connected to a drive side of a respective one of the countershafts of the range group part (3).

2. The parallel shift transmission according to claim 1, wherein the associated switching element (SR1, SR2) is positioned between the respective gearwheel pair (R1, R2) and the respective first and the second power-shift elements (5, 6) with respect to the direction of the power flow from the drive shaft (1; 23) to the output shaft (4).

3. The parallel shift transmission according to claim 1, wherein the respective gearwheel pair (R1, R2) is positioned between the respective first and the second power-shift elements (5, 6) and the associated switching element (SR1, SR2) with respect to the direction of the power flow from the drive shaft (1; 23) to the output shaft (4).

4. The parallel shift transmission according to claim 1, wherein the first and the second power-shift elements (5, 6) of the transmission branches of the splitter group part are combined in a double clutch (7), either a first input shaft (8), to which the plurality of gear steps (A1, A3, A5, A7) of one transmission branch of the splitter group part are coupled, or a second input shaft (9), to which the plurality of gear steps (A2, A4, A6, A8) of the other transmission branch of the splitter group part are connected, are couplable by the double clutch (7) to the drive shaft (1).

5. The parallel shift transmission according to claim 1, wherein the first and the second power-shift elements (5, 6) of the transmission branches are individual clutches (17, 18), and each clutch is positioned between countershafts (19, 20; 21, 22) of the associated transmission branch.

6. The parallel shift transmission according to claim 5, wherein the respective individual clutch (17, 18) is positioned either between the splitter group part (2) and the respective gearwheel pair (R1, R2) or between the respective gearwheel pair (R1, R2) and the range group part (3) with respect to the direction of the power flow from the drive shaft (1; 23) to the output shaft (4).

7. The parallel shift transmission according to claim 1, wherein at least:

the plurality of gear steps having a high stepped transmission ratio are positioned in an axial direction such that each lies individually on an associated plane, or at least group steps (B3.1, B3.2) having a high range transmission ratio are disposed individually for each transmission branch of the range group part in the axial direction such that each of the group steps (B3.1, B3.2) having the high range transmission ratio lies on an associated plane.

8. The parallel shift transmission according to claim 1, wherein at least:

the plurality of gear steps (A1 to A8) are provided in pairs in an axial direction, and each pair lying in a plane, or at least individual group steps (B1.1, B1.2, B2.1, B2.2) are provided for both transmission branches of the range group part in one axial plane in each case.

9. The parallel shift transmission according to claim 1, wherein a higher gear step is preselected, in an unloaded transmission branch, before actuation of one of the switching elements (SR1, SR2) in order to couple the parallel countershafts (10 to 13; 12, 14, 15, 16; 14, 16, 19 to 22) of the splitter group part and the range group part to one another.

10. The parallel shift transmission according to claim 1, wherein a gear step is not shifted, in an unloaded transmission branch before actuation of one of the switching elements (SR1, SR2), in order to couple the parallel countershafts (10 to 13; 12, 14, 15, 16; 14, 16, 19 to 22) of the splitter group part and the range group part.

11. A parallel shift transmission for one of an agricultural and a communal commercial vehicle, the parallel shift transmission comprising:

a splitter group portion and a range group portion, and the splitter group portion and the range group portions are both split into two parallel transmission branches which have parallel countershafts, where the countershafts of the splitter group portion are hollow and the countershafts of the range group portion extend completely through the hollow countershafts of the splitter group portion;

each of the two transmission branches is actuated by engagement of a respective first and second power-shift elements such that rotational movement of a drive shaft is transferred to one of the respective countershafts via one of a plurality of stepped transmission ratios of the splitter group portion that are associated with the selected one of the transmission branches, and rotation of the countershaft is converted and transmitted, via one of a plurality of range transmission ratios of the range group portion, to an output shaft of the shift transmission;

each of the stepped transmission ratios of the splitter group portion is a defined by engagement of an associated gear step of a plurality of gear steps of the splitter group portion, the plurality of gear steps are distributed in an alternating manner to the two transmission branches in a sequence of the associated stepped transmission ratios, and each of the range transmission ratios is determined by shifting an associated group step of a plurality of group steps of the range group portion; and the parallel countershafts are couplable to one another by individual gearwheel pairs, according to actuation of an associated switching elements, which reverse a rotational direction such that, with respect to a direction of power flow from the drive shaft to the output shaft, a countershaft on an output side of the splitter group portion is connected to the other countershaft at a drive side of the range group portion.

12. The parallel shift transmission according to claim 1, wherein a first countershaft of the splitter group part (2) is hollow and coaxial with a first of the two countershafts of the range group part (3), and a second of the two countershafts of the splitter group part (2) is hollow and coaxial with a second countershaft of the range group part (3), and the first and the second countershafts of the range group part respectively extend completely through the first and the second countershafts of the splitter group part.

13. The parallel shift transmission according to claim 1, wherein a first power-shift element is arranged on an input side of the splitter group part and facilitates transfer of drive from the drive shaft to a first of the two countershafts of the range group part (3), and a second power-shift element is arranged on the input side of the splitter group part and facilitates transfer of drive from the drive shaft to a second of the two countershafts of the range group part (3).

* * * * *